US012051380B2

(12) United States Patent
Feng

(10) Patent No.: US 12,051,380 B2
(45) Date of Patent: Jul. 30, 2024

(54) DISPLAY CONTROL METHOD, CONTROL APPARATUS AND NON-TRANSITORY COMPUTER-READABLE STORAGE MEDIUM

(71) Applicants: Haining ESWIN IC Design Co., Ltd., Jiaxing (CN); Beijing ESWIN Computing Technology Co., Ltd., Beijing (CN)

(72) Inventor: Guochen Feng, Zhenjiang (CN)

(73) Assignees: HAINING ESWIN IC DESIGN CO., LTD., Jiaxing (CN); BEIJING ESWIN COMPUTING TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/147,334

(22) Filed: Dec. 28, 2022

(65) Prior Publication Data

US 2023/0274709 A1 Aug. 31, 2023

(30) Foreign Application Priority Data

Feb. 28, 2022 (CN) ......................... 202210190730.7

(51) Int. Cl.
*G09G 3/34* (2006.01)
*G09G 3/36* (2006.01)

(52) U.S. Cl.
CPC ............. *G09G 3/3406* (2013.01); *G09G 3/36* (2013.01)

(58) Field of Classification Search
CPC ................... G09G 3/3406; G09G 3/36; G09G 2310/0237; G09G 2320/0247;
(Continued)

(56) References Cited

U.S. PATENT DOCUMENTS 5,583,535 A * 12/1996 Takarada .............. G06F 3/0412 345/182
5,892,551 A * 4/1999 Uematsu ............ H04N 5/44504 348/E5.064
(Continued)

FOREIGN PATENT DOCUMENTS

CN 101029986 A 9/2007
CN 102117608 A 7/2011
(Continued)

OTHER PUBLICATIONS

Search Report dated Apr. 18, 2023 from Office Action for Chinese Application No. 2022101907307 issued Apr. 22, 2023. 3 pgs.
(Continued)

*Primary Examiner* — Benyam Ketema
(74) *Attorney, Agent, or Firm* — Ladas & Parry, LLP

(57) ABSTRACT

The present application discloses a display control method, a display control apparatus, a control apparatus and a display device. The display control method comprises: frequency multiplying or dividing an input display signal to generate an output display signal based on the relationship between the field frequency of the input display signal and the maximum field frequency supported by a display apparatus, the field frequency of the output display signal being not less than the minimum field frequency supported by the display apparatus and not greater than the maximum field frequency supported by the display apparatus; and controlling a backlight module to be turned on based on the field frequency of the output display signal, so that the liquid crystal stabilization time is increased. With the present application, the motion blur reduction effect can be improved, the blurred moving pictures can be reduced, and the smearing can be reduced.

17 Claims, 4 Drawing Sheets

(58) Field of Classification Search
CPC ... G09G 2320/0257; G09G 2340/0435; G09G 3/3611
See application file for complete search history.

(56) References Cited

U.S. PATENT DOCUMENTS

| | | | | |
|---|---|---|---|---|
| 6,313,813 | B1 * | 11/2001 | Narui | G09G 1/167 345/3.2 |
| 6,400,409 | B1 * | 6/2002 | Wilber | H04N 3/27 348/542 |
| 6,411,267 | B1 * | 6/2002 | Narui | G09G 1/165 345/10 |
| 6,492,973 | B1 * | 12/2002 | Kuroki | G09G 5/006 375/376 |
| 8,441,430 | B2 * | 5/2013 | Lee | G02B 30/24 345/419 |
| 8,681,159 | B2 * | 3/2014 | Culbert | G09G 5/12 345/502 |
| 11,410,616 | B2 * | 8/2022 | Meng | G09G 3/3406 |
| 11,600,226 | B2 * | 3/2023 | Hwang | G09G 3/3208 |
| 2003/0174153 | A1 * | 9/2003 | Koyama | G09G 3/3275 345/690 |
| 2003/0179221 | A1 * | 9/2003 | Nitta | G09G 3/3648 345/690 |
| 2004/0095364 | A1 * | 5/2004 | Koyama | G09G 5/363 345/690 |
| 2008/0018587 | A1 | 1/2008 | Honbo et al. | |
| 2011/0157260 | A1 * | 6/2011 | Pyun | H04N 13/398 345/691 |
| 2011/0205223 | A1 * | 8/2011 | Lee | G09G 3/3406 345/419 |
| 2011/0292289 | A1 * | 12/2011 | Kobayashi | H04N 9/3126 348/E5.077 |
| 2012/0162289 | A1 | 6/2012 | Oniki | |
| 2015/0062100 | A1 * | 3/2015 | Tanaka | G09G 3/3648 345/204 |
| 2015/0348509 | A1 * | 12/2015 | Verbeure | H04N 9/3188 345/82 |
| 2017/0075432 | A1 * | 3/2017 | Verbeure | G09G 5/08 |
| 2019/0122623 | A1 * | 4/2019 | Lee | G09G 3/3614 |
| 2019/0164506 | A1 * | 5/2019 | Wu | G09G 3/3406 |
| 2021/0097940 | A1 * | 4/2021 | Chen | G09G 3/342 |
| 2021/0158755 | A1 * | 5/2021 | Li | G09G 3/3266 |
| 2023/0274708 | A1 * | 8/2023 | Feng | G09G 3/3406 345/204 |

FOREIGN PATENT DOCUMENTS

| | | | | | |
|---|---|---|---|---|---|
| CN | 102163408 | A | | 8/2011 | |
| CN | 102473394 | A | | 5/2012 | |
| CN | 102956209 | A | | 3/2013 | |
| CN | 103151005 | A | | 6/2013 | |
| JP | 2010243660 | | * | 10/2010 | G02F 1/133 |
| JP | 5 208035 | B2 | | 6/2013 | |

OTHER PUBLICATIONS

Search Report dated Aug. 31, 2023 from the Office Action for Chinese Application No. 202210190730.7 issued Sep. 7, 2023, pp. 1-3.

* cited by examiner

DISPLAY CONTROL METHOD, CONTROL APPARATUS AND NON-TRANSITORY COMPUTER-READABLE STORAGE MEDIUM

CROSS-REFERENCES TO RELATED APPLICATIONS

The application claims the benefit of Chinese Patent Application No. 202210190730.7 filed on Feb. 28, 2022 in the China National Intellectual Property Administration, the disclosure of which is incorporated herein by reference in its entirety.

TECHNICAL FIELD

The present application relates to the technical field of display, and in particular to a display control method, a display control apparatus, a control apparatus and a display device.

BACKGROUND

When a display device implements MBR (Motion Blur Reduction) function, the backlight needs to be turned on at the VFP (Vertical Front Porch) time of the input display signal and the backlight should be turned off before the liquid crystal refresh of the next frame.

At present, the motion blur reduction effect of some display devices is poor, resulting in blurred moving pictures and serious smearing.

SUMMARY

In a first aspect, an embodiment of the present application provides a display control method, including:

frequency multiplying or dividing an input display signal to generate an output display signal based on the relationship between the field frequency of the input display signal and the maximum field frequency supported by a display apparatus, the field frequency of the output display signal being not less than the minimum field frequency supported by the display apparatus and not greater than the maximum field frequency supported by the display apparatus; and controlling a backlight module to be turned on based on the field frequency of the output display signal, so that the liquid crystal stabilization time is increased.

In a second aspect, an embodiment of the present application provides a control apparatus, including:

a processor;

a memory in communication with the processor; and at least one computer program stored in the memory and configured to be executed by the processor, the at least one computer program being configured to implement the display control method in the first aspect.

In a third aspect, an embodiment of the present application provides a display device, including a display apparatus, a backlight module and the control apparatus in the second aspect;

the control apparatus is electrically connected to the display apparatus and the backlight module;

the control apparatus sends an output display signal to the display apparatus; and the control apparatus sends a control signal to the backlight module to control the backlight module to be turned on and off.

In a fourth aspect, an embodiment of the present application provides a display control apparatus, including:

a signal generation module, configured to frequency multiply or divide an input display signal to generate an output display signal based on the relationship between the field frequency of the input display signal and the maximum field frequency supported by a display apparatus, the field frequency of the output display signal being not less than the minimum field frequency supported by the display apparatus and not greater than the maximum field frequency supported by the display apparatus; and a backlight control module configured to control a backlight module to be turned on based on the field frequency of the output display signal, so that the liquid crystal stabilization time is increased.

In a fifth aspect, an embodiment of the present application provides a non-transitory computer-readable storage medium, the computer program is stored in the non-transitory computer-readable storage medium and the computer program is executed by a computer to implement the display control method in the first aspect.

Additional aspects and advantages of the present application will be given in the following description, some of which will become apparent from the following description or appreciated by implementing the present application.

BRIEF DESCRIPTION OF THE DRAWINGS

The above and/or additional aspects and advantages of the present application will become apparent and readily understood from the following description of embodiments taken in conjunction with the accompanying drawings, in which.

REFERENCE NUMERALS

Figure 1:
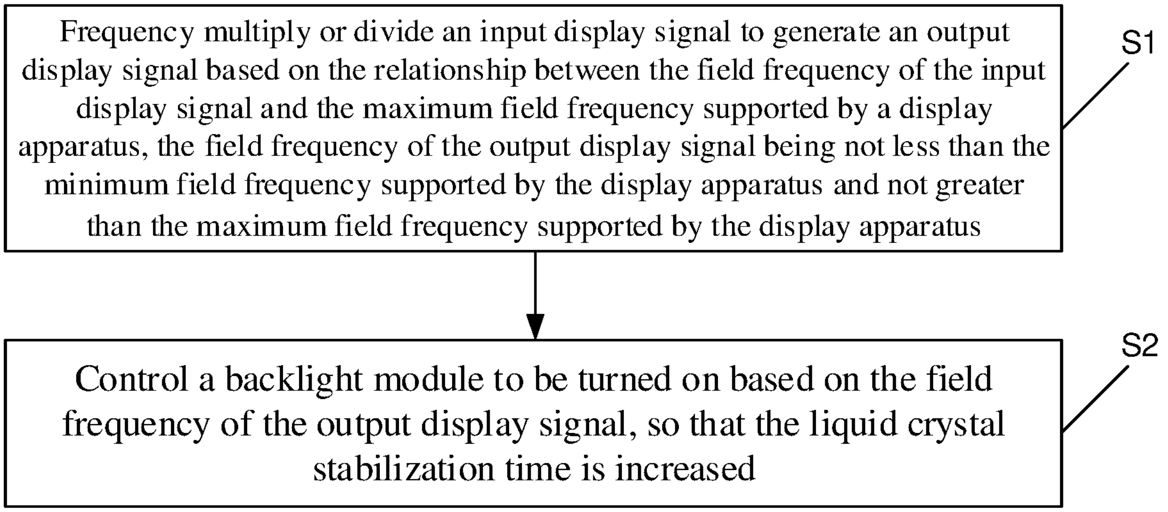
FIG. 1 is a schematic flowchart of a display control method according to an embodiment of the present application.

100: display device; 10: control apparatus; 20: display apparatus; and 30: backlight module.

DETAILED DESCRIPTION

Examples of embodiments of the present application will be illustrated below in the drawings throughout which same or similar reference numerals refer to same or similar elements or elements having same or similar functions. Also, detailed descriptions of known technologies will be omitted if they are not necessary for the illustrated features of the present application. The embodiments described with reference to the drawings are illustrative, merely used for explaining the present application and should not be regarded as any limitations thereto.

It may be understood by a person of ordinary skill in the art that, unless otherwise defined, all terms (including technical and scientific terms) used herein have the same meaning as commonly understood by a person of ordinary skill in the art to which the present application belongs. It should also be understood that terms, such as those defined in a general dictionary, should be understood to have meanings consistent with their meanings in the context of the prior art and, unless specifically defined as herein, should not be interpreted in idealistic or overly formal meaning.

It should be understood by a person of ordinary skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

It was found by the inventor(s) of the present application that, due to the very short VFP (Vertical Front Porch) time, there is no or only very short liquid crystal stabilization time. As a result, the liquid crystal flipping occurs when the backlight is turned on, or the backlight is turned on before the liquid crystals are flipped in place due to the long response time of the liquid crystal. In this case, the motion blur reduction effect is poor, resulting in blurred moving pictures and serious smearing.

The present application provides a display control method, a display control apparatus, a control apparatus and a display device, to solve the above technical problem in the prior art.

The technical solutions of the present application and how to solve the above technical problems by the technical solutions of the present application will be described below by specific embodiments in detail. The specific embodiments to be described below may be combined, and the same or similar concepts or processes may be not repeated in some embodiments. The embodiments of the present application will be described below with reference to the accompanying drawings.

Figure 6:
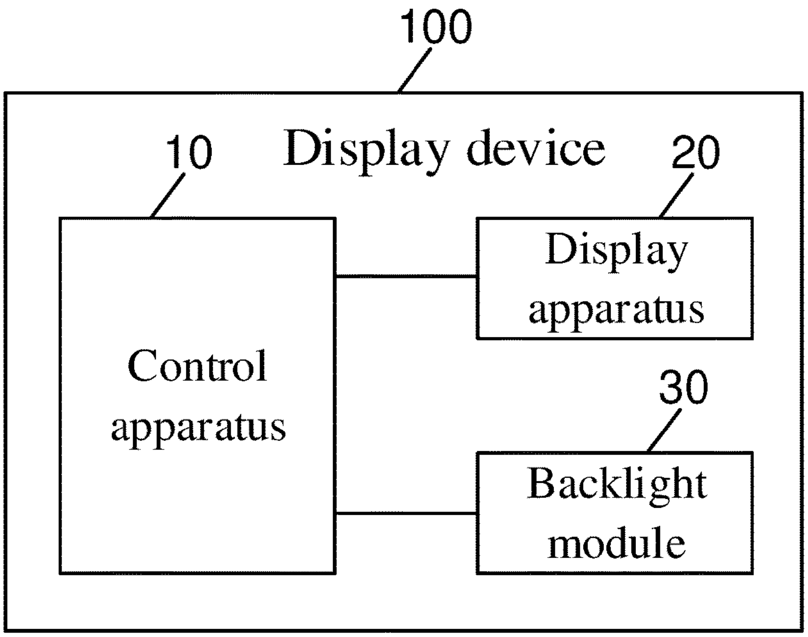
FIG. 6 is a schematic diagram of the architecture of a display device according to an embodiment of the present application.

An embodiment of the present application provides a display device 100. As shown in FIG. 6, the display device 100 includes a display apparatus 20, a backlight module 30, and a control apparatus 10. The control apparatus 10 is electrically connected to both the display apparatus 20 and the backlight module 30. The display apparatus 20 is a liquid crystal display apparatus.

The control apparatus 10 sends an output display signal to the display apparatus 20.

The control apparatus 10 sends a control signal to the backlight module 30 to control the backlight module 30 to be turned on and off.

By the display device 100 in the embodiment of the present application, the motion blur reduction effect can be improved, the blurred moving pictures can be reduced, and the smearing can be reduced.

An embodiment of the present application provides a control apparatus 10, as shown in FIG. 6, the control apparatus 10 includes:

a processor;

a memory in communication with the processor; and at least one computer program stored in the memory and configured to be executed by the processor, the at least one computer program being configured to implement the display control method in any of the following embodiments.

An embodiment of the present application provides a display control method, which is applied to the display device 100 in the foregoing embodiment. As shown in FIG. 1, the display control method includes steps S1-S2.

S1: frequency multiplying or dividing an input display signal to generate an output display signal based on the relationship between the field frequency of the input display signal and the maximum field frequency supported by a display apparatus, the field frequency of the output display signal being not less than the minimum field frequency supported by the display apparatus and not greater than the maximum field frequency supported by the display apparatus; and

S2: controlling a backlight module to be turned on based on the field frequency of the output display signal, so that the liquid crystal stabilization time is increased.

The liquid crystal stabilization time is the interval time from the starting time of the vertical front porch time of the first period among periods in which frame display data of the output display signal is the same to the starting time when the backlight module is turned on.

In the display control method in the embodiment of the present application, an input display signal is frequency multiplied or divided to generate an output display signal, and a backlight module is controlled to be turned on based on the field frequency of the output display signal so that the liquid crystal stabilization time is increased, that is, the liquid crystal stabilization time is increased by frequency multiplying or dividing, so that there is more time to wait for the liquid crystals to flip and stabilize. Thus, the motion blur reduction effect can be improved, the blurred moving pictures can be reduced, and the smearing can be reduced.

Figure 2:
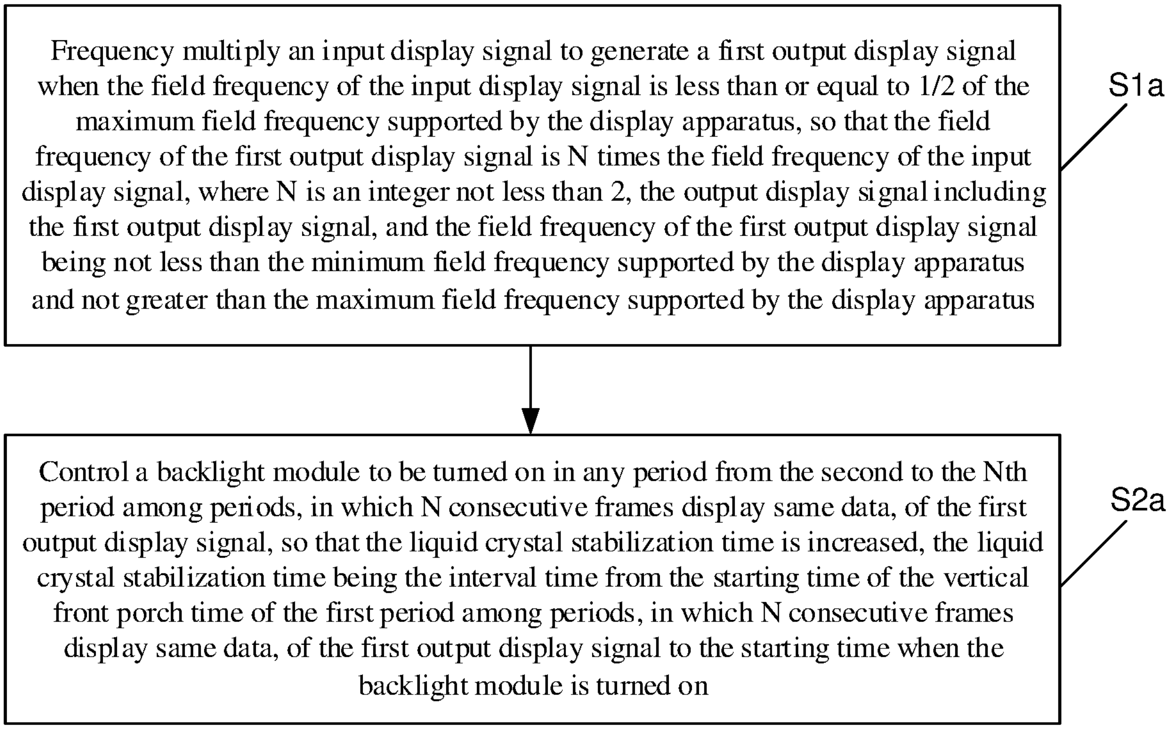
FIG. 2 is a schematic flowchart of another display control method according to an embodiment of the present application.

In some embodiments, as shown in FIG. 2, frequency multiplying or dividing an input display signal to generate an output display signal based on the relationship between the field frequency of the input display signal and the maximum field frequency supported by a display apparatus, the field frequency of the output display signal being not less than the minimum field frequency supported by the display apparatus and not greater than the maximum field frequency supported by the display apparatus, includes:

S1*a*: frequency multiplying an input display signal to generate a first output display signal when the field frequency of the input display signal is less than or equal to ½ of the maximum field frequency supported by the display apparatus, so that the field frequency of the first output display signal is N times the field frequency of the input display signal, where N is an integer not less than 2, the output display signal including the first output display signal, and the field frequency of the first output display signal being not less than the minimum field frequency supported by the display apparatus and not greater than the maximum field frequency supported by the display apparatus.

In some embodiments, as shown in FIG. 2, controlling a backlight module to be turned on based on the field frequency of the output display signal, so that the liquid crystal stabilization time is increased, includes:

S2*a*: controlling a backlight module to be turned on in any period from the second to the Nth period among periods, in which N consecutive frames display same data, of the first output display signal, so that the liquid crystal stabilization time is increased, the liquid crystal stabilization time being the interval time from the starting time of the vertical front porch time of the first period among periods, in which N consecutive frames display same data, of the first output display signal to the starting time when the backlight module is turned on.

Figure 3A:
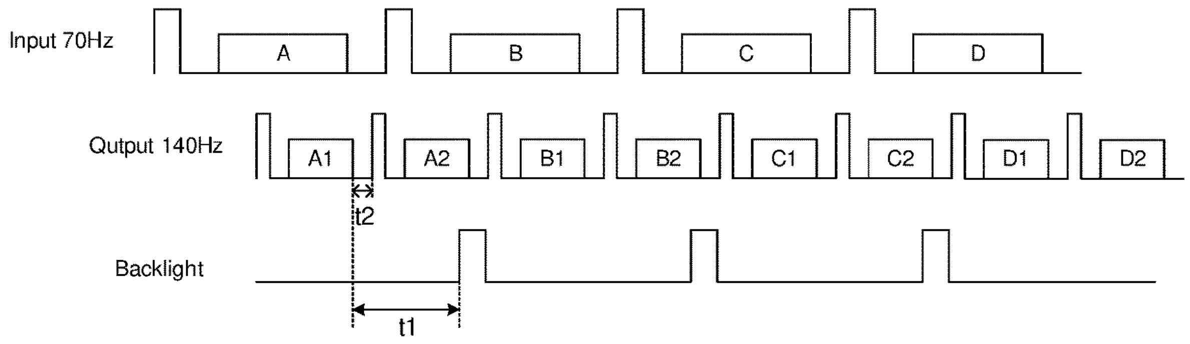
FIG. 3*a* is a timing diagram of a display control method by a frequency multiply-by-2 process according to an embodiment of the present application.

Exemplarily, as shown in FIG. 3*a*, Input 70 Hz means that the field frequency of the input display signal is 70 Hz. Output 140 Hz means that the field frequency of the first output display signal is 140 Hz. t1 represents the liquid crystal stabilization time obtained by a frequency multiply-by-2 process. t2 represents the VFP (Vertical Front Porch) time of the first output display signal.

Figure 3B:
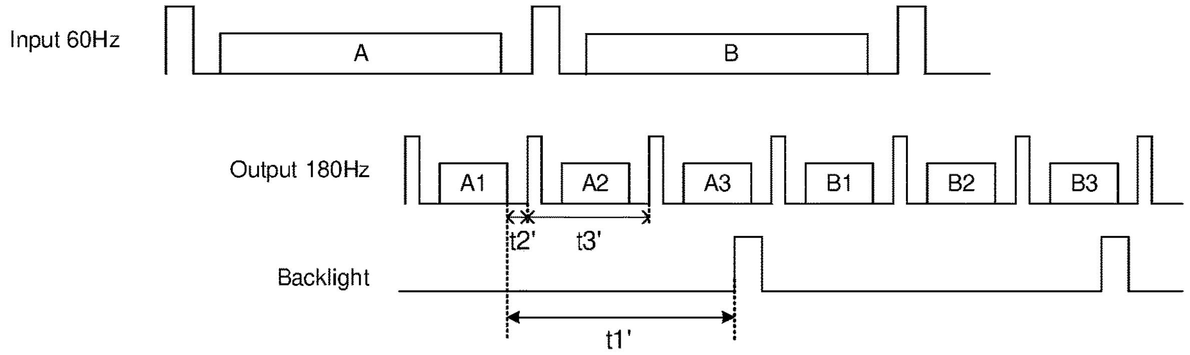
FIG. 3*b* is a timing diagram of a display control method by a frequency multiply-by-3 process according to an embodiment of the present application.

Exemplarily, as shown in FIG. 3*b*, Input 60 Hz means that the field frequency of the input display signal is 60 Hz. Output 180 Hz means that the field frequency of the first output display signal is 180 Hz. t1' represents the liquid crystal stabilization time obtained by a frequency multiply-by-3 process. t2' represents the VFP (Vertical Front Porch) time of the first output display signal. t3' represents one period of the first output display signal.

Exemplarily, as shown in FIG. 3*a*, the liquid crystal stabilization time t1 is greater than the VFP time t2 of the first output display signal.

Exemplarily, as shown in FIG. 3*b*, the liquid crystal stabilization time t1' is greater than the sum of the VFP time t2' of the first output display signal and one period t3' of the first output display signal, that is, t1'>t2'+t3'.

In the display control method in the embodiment of the present application, an input display signal is frequency multiplied, and a backlight module is controlled to be turned on in any period from the second to the Nth period among periods, in which N consecutive frames display same data, of the first output display signal, so that the liquid crystal stabilization time is increased. One piece of frame display data may display one picture. That is, in the embodiment of the present application, the liquid crystals are flipped as soon as possible by means of frequency multiplying, and meanwhile, and the backlight is turned on after the liquid crystals are flipped and stabilized within the time for the repeated pictures. Thus, the motion blur reduction effect can be improved, the blurred moving pictures can be reduced, and the smearing can be reduced.

In some embodiments, one period of the input display signal corresponds to N consecutive periods of the first output display signal, and the frame display data of one period of the input display signal is the same as the frame display data of N consecutive periods of the first output display signal.

Exemplarily, in FIG. 3*a*, Backlight represents a control signal for controlling the backlight module. A, B, C, and D represent four pieces of frame display data of the input display signal. One piece of frame display data may display one picture. It may also be understood that the input display signal inputs four pictures. A1, A2, B1, B2, C1, C2, D1, and D2 represent eight pieces of frame display data of the first output display signal, and one piece of frame display data may display one picture. It may also be understood that the first output display signal outputs eight pictures.

Exemplarily, in FIG. 3*b*, Backlight represents a control signal for controlling the backlight module. A, B represent two pieces of frame display data of the input display signal. One piece of frame display data may display one picture. It may also be understood that the input display signal inputs two pictures. A1, A2, A3, B1, B2 and B3 represent six pieces of frame display data of the first output display signal, and one piece of frame display data may display one picture. It may also be understood that the first output display signal outputs six pictures.

In FIG. 3*a*, the input display signal includes four pieces of frame display data A, B, C, and D. After the input display signal is subjected to a frequency multiply-by-2 process, a first output display signal is generated, and the first output display signal includes eight pieces of frame display data A1, A2, B1, B2, C1, C2, D1 and D2. After the frequency multiplication process, the field frequency of the first output display signal is twice the field frequency of the input display signal.

In FIG. 3*b*, the input display signal includes two pieces of frame display data A and B. After the input display signal is subjected to a frequency multiply-by-3 process, a first output display signal is generated, and the first output display signal includes six pieces of frame display data A1, A2, A3, B1, B2, B3. After the frequency multiplication process, the field frequency of the first output display signal is three times the field frequency of the input display signal.

In FIG. 3*a*, the frame display data A of the input display signal is the same as the frame display data A1 and A2 of the first output display signal. That is, the picture content displayed by the frame display data A of the input display signal is the same as the picture content displayed by the frame display data A1 and A2 of the first output display signal. So do the other frames. For example, the frame display data B of the input display signal is the same as the frame display data B1 and B2 of the first output display signal. That is, the picture content displayed by the frame display data B of the input display signal is the same as the picture content displayed by the frame display data B1 and B2 of the first output display signal.

In FIG. 3*b*, the frame display data A of the input display signal is the same as the frame display data A1, A2 and A3 of the first output display signal. That is, the picture content displayed by the frame display data A of the input display signal is the same as the picture content displayed by the frame display data A1, A2 and A3 of the first output display signal. So do the other frames. For example, the frame display data B of the input display signal is the same as the frame display data B1, B2 and B3 of the first output display signal. That is, the picture content displayed by the frame display data B of the input display signal is the same as the picture content displayed by the frame display data B1, B2 and B3 of the first output display signal.

In some embodiments, controlling a backlight module to be turned on in any period from the second to the Nth period among periods, in which N consecutive frames display same data, of the first output display signal includes:

controlling a backlight module to be turned on in the Nth period among periods, in which N consecutive frames display same data, of the first output display signal.

Exemplarily, as shown in FIG. 3*b*, a backlight module is controlled to be turned on in the third period among periods in which three pieces of consecutive frame display data of the first output display signal are the same.

Exemplarily, as shown in FIG. 3*b*, the liquid crystal stabilization time t1' is greater than the sum of the VFP time t2' of the first output display signal and one period t3' of the first output display signal, that is, t1'>t2'+t3'.

In the embodiment of the present application, by frequency multiplying the input display signal, the frame display data A of the input display signal can also be frequency multiplied to output a plurality of pieces of consecutive repeated frame display data A1, A2 . . . An (n>=2). In the period corresponding to the output frame display data An, the backlight module is controlled to generate a pulsed backlight (the high level of Backlight in FIG. 3*a* and FIG. 3*b*), so that the liquid crystal stabilization time (t1' in FIG. 3*b*) is further increased. Thus, there is more time to wait for the liquid crystals to flip and stabilize, that is, the time left for liquid crystal flipping is further increased. There is enough time for liquid crystal flipping, so there is enough time to wait for the liquid crystals to flip and stabilize. Thus, the motion blur reduction effect can be further improved, the blurred moving pictures can be reduced, and the smearing can be reduced.

In some embodiments, after controlling a backlight module to be turned on in any period from the second to the Nth period among periods, in which N consecutive frames display same data, of the first output display signal, the method includes:

- controlling a backlight module to be turned off before the starting time of a period, in which next N consecutive frames display same data, of the first output display signal.

Optionally, the turn-on time of the backlight module, that is, the width of the pulsed backlight (the time with high level of Backlight in FIG. 3*a* and FIG. 3*b*) may be set according to actual conditions, which is not particularly limited in the present application.

It should be noted that the field frequency in the present application is also called frame frequency or refresh frequency, i.e., the vertical scanning frequency of the display, which refers to the number of images the display can display per second. The unit is Hertz (Hz).

The input display signal in the present application may be a signal output by a signal source, for example, a graphics card, a DVD (Digital Video Disc), etc., which is not particularly limited in the present application. The first output display signal obtained by the frequency multiplication process is output to the liquid crystal display apparatus.

The field frequency of the input display signal may be 60 Hz, 70 Hz, 80 Hz, 90 Hz, 100 Hz, 110 Hz, 120 Hz, 130 Hz, 140 Hz, etc. The field frequency of the first output display signal may be 100 Hz, 110 Hz, 120 Hz, 130 Hz, 140 Hz, etc. The field frequency of the first output display signal is not particularly limited in the present application as long as it does not exceed the range of the field frequency supported by the liquid crystal display apparatus.

If the field frequency of the input display signal is relatively small, when the field frequency of the input display signal is less than or equal to ½ of the maximum field frequency supported by the display apparatus, that is, when the field frequency of the input display signal is or less than half of the maximum support field frequency of the liquid crystal display apparatus, the input display signal is frequency multiplied. The input display signal may be frequency multiplied by two, three, four, five, according to actual situations. It is not particularly limited in the present application.

Exemplarily, as shown in FIG. 3*a*, if the field frequency of the input display signal is 70 Hz, the maximum field frequency supported by the display apparatus is 140 Hz. After the input display signal is frequency multiplied by two, a first output display signal is generated. The field frequency of the first output display signal is 140 Hz.

Exemplarily, as shown in FIG. 3*b*, if the field frequency of the input display signal is 60 Hz, the maximum field frequency supported by the display apparatus is 180 Hz. After the input display signal is frequency multiplied by three, a first output display signal is generated. The field frequency of the first output display signal is 180 Hz.

Exemplarily, if the field frequency of the input display signal is 60 Hz, the maximum field frequency supported by the display apparatus is 180 Hz, and the minimum field frequency supported by the display apparatus is 40 Hz. The input display signal may be frequency multiplied by two to generate a first output display signal. The field frequency of the first output display signal is 120 Hz. Or, the input display signal is frequency multiplied by three to generate a first output display signal. The field frequency of the first output display signal is 180 Hz. The field frequency of the first output display signal is not particularly limited in the present application as long as it does not exceed the range of the field frequency supported by the display apparatus.

Figure 4:
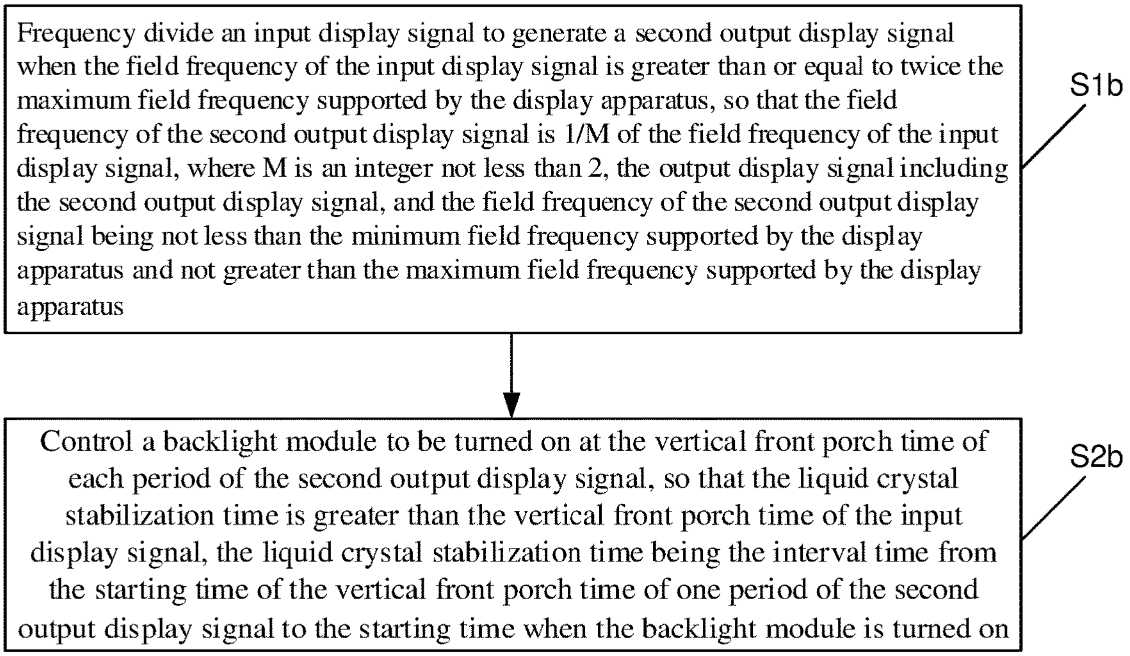
FIG. 4 is a schematic flowchart of still another display control method according to an embodiment of the present application.

In some embodiments, as shown in FIG. 4, frequency multiplying or dividing an input display signal to generate an output display signal based on the relationship between the field frequency of the input display signal and the maximum field frequency supported by a display apparatus, the field frequency of the output display signal being not less than the minimum field frequency supported by the display apparatus and not greater than the maximum field frequency supported by the display apparatus, includes:

S1*b*: frequency dividing an input display signal to generate a second output display signal when the field frequency of the input display signal is greater than or equal to twice the maximum field frequency supported by the display apparatus, so that the field frequency of the second output display signal is 1/M of the field frequency of the input display signal, where M is an integer not less than 2, the output display signal including the second output display signal, and the field frequency of the second output display signal being not less than the minimum field frequency supported by the display apparatus and not greater than the maximum field frequency supported by the display apparatus.

In some embodiments, as shown in FIG. 4, controlling a backlight module to be turned on based on the field frequency of the output display signal, so that the liquid crystal stabilization time is increased, includes:

S2*b*: controlling a backlight module to be turned on at the vertical front porch time of each period of the second output display signal, so that the liquid crystal stabilization time is greater than the vertical front porch time of the input display signal, the liquid crystal stabilization time being the interval time from the starting time of the vertical front porch time of one period of the second output display signal to the starting time when the backlight module is turned on.

Figure 5A:
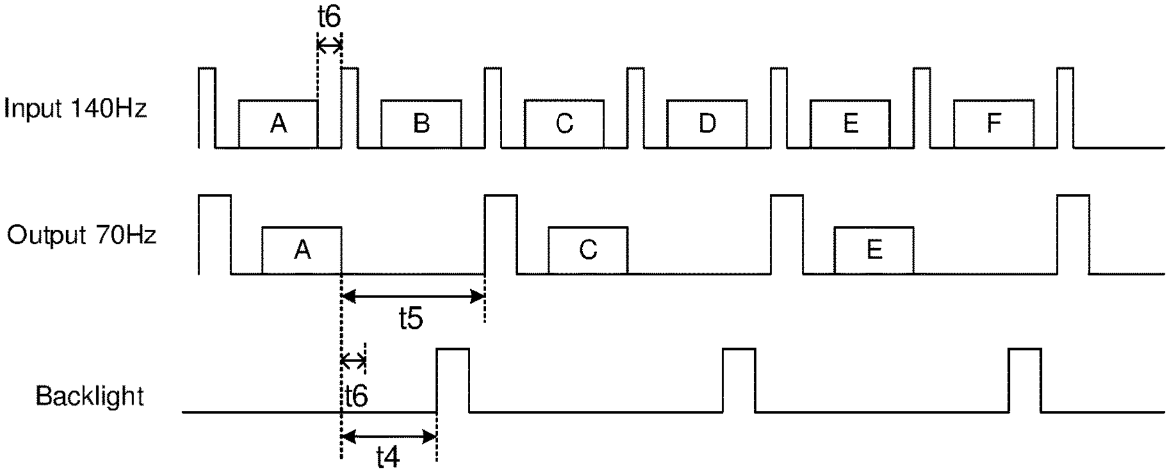
FIG. 5*a* is a timing diagram of a display control method by a frequency divide-by-2 process according to an embodiment of the present application.

Exemplarily, as shown in FIG. 5*a*, Input 140 Hz means that the field frequency of the input display signal is 140 Hz. Output 70 Hz means that the field frequency of the second output display signal is 70 Hz. t4 represents the liquid crystal stabilization time obtained by dividing frequency of the input display signal by 2. t5 represents the VFP (Vertical Front Porch) time of the second output display signal. t6 represents the VFP time of the input display signal.

Figure 5B:
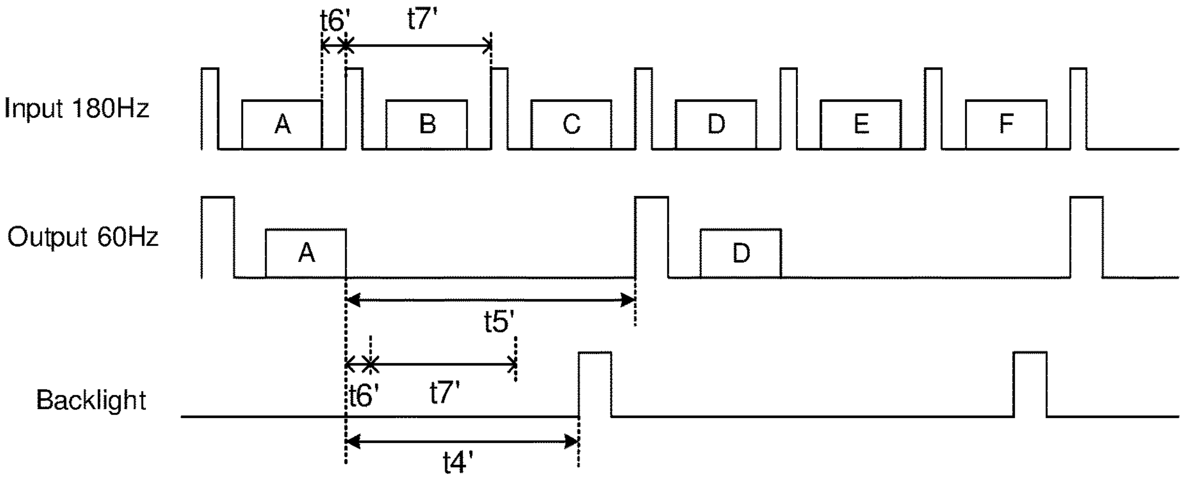
FIG. 5*b* is a timing diagram of a display control method by a frequency divide-by-3 process according to an embodiment of the present application.

Exemplarily, as shown in FIG. 5*b*, Input 180 Hz means that the field frequency of the input display signal is 180 Hz. Output 60 Hz means that the field frequency of the second output display signal is 60 Hz. t4' represents the liquid crystal stabilization time obtained by dividing frequency of the input display signal by 3. t5' represents the VFP (Vertical Front Porch) time of the second output display signal. t6' represents the VFP time of the input display signal. t7' represents one period of the input display signal.

Exemplarily, as shown in FIG. 5*a*, the liquid crystal stabilization time t4 is greater than the VFP time t6 of the input display signal.

Exemplarily, as shown in FIG. 5*b*, the liquid crystal stabilization time t4' is greater than the sum of the VFP time t6' of the input display signal and one period t7' of the input display signal, that is, t4'>t6'+t7'.

In the display control method in the embodiment of the present application, an input display signal is frequency divided, and the vertical front porch time of the second output display signal is increased so that the liquid crystal stabilization time is increased, that is, there is enough time to wait for the liquid crystals to flip and stabilize and then turn on the backlight. Thus, the motion blur reduction effect can be improved, the blurred moving pictures can be reduced, and the smearing can be reduced.

In some embodiments, M consecutive periods of the input display signal correspond to one period of the second output display signal, and the frame display data of the first period among the M consecutive periods of the input display signal is the same as the frame display data of one period of the second output display signal.

Exemplarily, in FIG. 5*a*, Backlight represents a control signal for controlling the backlight module. A, B, C, D, E and F represent six pieces of frame display data of the input display signal, and one piece of frame display data may display one picture. It may also be understood that the input display signal inputs six pictures. A, C and E represent three pieces of frame display data of the second output display signal, and one piece of frame display data may display one picture. It may also be understood that the second output display signal outputs three pictures.

Exemplarily, in FIG. 5*b*, Backlight represents a control signal for controlling the backlight module. A, B, C, D, E and F represent six pieces of frame display data of the input display signal, and one piece of frame display data may display one picture. It may also be understood that the input display signal inputs six pictures. A and D represent two pieces of frame display data of the second output display signal, and one piece of frame display data may display one picture. It may also be understood that the second output display signal outputs two pictures.

In FIG. 5*a*, the input display signal includes six pieces of frame display data A, B, C, D, E and F. The input display signal is subjected to a ½ frequency division (frequency elimination) process to generate a second output display signal, and the second output display signal includes three pieces of frame display data A, C and E. After the frequency division process, some pieces of frame display data B, D and F are discarded. The field frequency of the second output display signal is ½ of the field frequency of the input display signal.

In FIG. 5*b*, the input display signal includes six pieces of frame display data A, B, C, D, E and F. The input display signal is subjected to a ⅓ frequency division (frequency elimination) process to generate a second output display signal, and the second output display signal includes two pieces of frame display data A and D. After the frequency division process, some pieces of frame display data B, C, E and F are discarded. The field frequency of the second output display signal is ⅓ of the field frequency of the input display signal. In practice, in some display apparatuses with a high refresh rate, the human eyes will not notice that some pictures are discarded, and the display effect will not be affected.

In some embodiments, controlling a backlight module to be turned on at the vertical front porch time of each period of the second output display signal, so that the liquid crystal stabilization time is greater than the vertical front porch time of the input display signal, includes:

controlling a backlight module to be turned on at the vertical front porch time of each period of the second output display signal, so that the liquid crystal stabilization time is greater than the sum of the vertical front porch time of the input display signal and M−2 periods of the input display signal.

Exemplarily, when M=3, the input display signal is frequency divided by 3 to generate a second output display signal, and the field frequency of the second output display signal is ⅓ of the field frequency of the input display signal. As shown in FIG. 5*b*, the liquid crystal stabilization time t4' is greater than the sum of the VFP time t6' of the input display signal and one period t7' of the input display signal, that is, t4'>t6'+t7'.

In the embodiment of the present application, the input display signal is subjected to a frequency division (or frequency elimination) process, and after some pieces of frame display data are discarded, the VTotal of the second output display signal (that is, the period corresponding to one piece of frame display data, that is, one period of the second output display signal) becomes larger, the VFP time (for example, t5' in FIG. 5*b*) becomes larger, so that the liquid crystal stabilization time (for example, t4' in FIG. 5*b*) is further increased, and there is enough time to wait for the liquid crystals to flip and stabilize. During the VFP time of the second output display signal, after the liquid crystals are fully flipped, the backlight module is controlled to generate a pulsed backlight (the high level of Backlight in FIG. 5*a* and FIG. 5*b*). Thus, the motion blur reduction effect can be further improved, the blurred moving pictures can be reduced, and the smearing can be reduced.

In some embodiments, after controlling a backlight module to be turned on at the vertical front porch time of each period of the second output display signal, the method includes:

controlling the backlight module to be turned off before the starting time of a next period of the second output display signal.

Optionally, the turn-on time of the backlight module, that is, the width of the pulsed backlight (the time with high level of Backlight in FIG. 5*a* and FIG. 5*b*) may be set according to actual conditions, which is not particularly limited in the present application.

The field frequency of the input display signal may be 60 Hz, 70 Hz, 80 Hz, 90 Hz, 100 Hz, 110 Hz, 120 Hz, 130 Hz, 140 Hz, etc. The field frequency of the second output display signal may be 60 Hz, 70 Hz, 80 Hz, 90 Hz, etc. The field frequency of the second output display signal is not particularly limited in the present application as long as it does not exceed the range of the field frequency supported by the liquid crystal display apparatus.

If the field frequency of the input display signal is relatively large, when the field frequency of the input display signal is greater than or equal to twice the maximum field frequency supported by the display apparatus, that is, the field frequency of the input display signal is or greater than twice the maximum support field frequency of the liquid crystal display apparatus, the input display signal is frequency divided. The input display signal may be frequency divided by 2, 3, 4, 5 . . . according to actual situations.

Exemplarily, as shown in FIG. 5*a*, if the field frequency of the input display signal is 140 Hz, the maximum field frequency supported by the display apparatus is 70 Hz. After dividing frequency of the input display signal by 2, a second output display signal is generated, and the field frequency of the second output display signal is 70 Hz.

Exemplarily, as shown in FIG. 5*b*, if the field frequency of the input display signal is 180 Hz, the maximum field frequency supported by the display apparatus is 60 Hz. After dividing frequency of the input display signal by 3, a second output display signal is generated, and the field frequency of the second output display signal is 60 Hz.

Exemplarily, if the field frequency of the input display signal is 180 Hz, the maximum field frequency supported by the display apparatus is 90 Hz, and the minimum field frequency supported by the display apparatus is 50 Hz. The input display signal may be frequency divided by 3 to generate a second output display signal, and the field frequency of the second output display signal is 60 Hz. Or, the input display signal is frequency divided by 2 to generate a second output display signal. The field frequency of the second output display signal is 90 Hz.

In an application scenario, the user may select the resolution of the liquid crystal display apparatus according to actual needs. The resolution of the liquid crystal display apparatus may be 1920×1080, 1366×768, 1280×768, 1280×720, etc. Different resolutions correspond to different ranges of field frequency supported by the liquid crystal display apparatus.

For example, the user selects a resolution of the liquid crystal display apparatus, and the range of field frequency supported by the liquid crystal display apparatus corresponding to the resolution is 40 Hz-60 Hz. Then, determination may be made in advance. If the field frequency of the input display signal is 50 Hz, that is, the field frequency of the input display signal is within the range of field frequency supported by the liquid crystal display apparatus, then it jumps to another program, and the display control method of the present application is not used.

Based on the same disclosure concept, an embodiment of the present application provides a display control apparatus, including:

- a signal generation module, configured to frequency multiply or divide an input display signal to generate an output display signal based on the relationship between the field frequency of the input display signal and the maximum field frequency supported by a display apparatus, the field frequency of the output display signal being not less than the minimum field frequency supported by the display apparatus and not greater than the maximum field frequency supported by the display apparatus; and
- a backlight control module configured to control a backlight module to be turned on based on the field frequency of the output display signal, so that the liquid crystal stabilization time is increased.

Based on the same disclosure concept, an embodiment of the present application provides a non-transitory computer-readable storage medium, a computer program is stored in the non-transitory computer-readable storage medium and the computer program is executed by a computer to implement the display control method described in any of the foregoing embodiments.

The computer-readable medium of the present application may be a computer-readable signal medium or a computer-readable storage medium or any combination of the above two. The computer-readable storage medium may be, but not limited to, an electrical, magnetic, optical, electromagnetic, infrared, or semiconductor system, apparatus, or device, or any combination thereof, for example. More specific examples of the computer-readable storage medium may include, but not limited to, electrical connections with one or more wires, portable computer disks, hard disks, random access memories (RAMs), read-only memories (ROMs), erasable programmable read only memories (EPROMs or flash memories), optical fibers, portable compact disk read only memories (CD-ROMs), optical storage devices, magnetic storage devices, or any suitable combination thereof.

In the present application, the computer-readable storage medium may be any tangible medium that contains or stores a computer program, and the computer program may be used by or together with an instruction execution system, apparatus, or device. In the present application, the computer-readable signal medium may include data signals propagated in the baseband or as part of carriers, and may carry computer-readable program codes. Such propagated data signals may be in various forms, including but not limited to electromagnetic signals, optical signals, or any suitable combination thereof. The computer-readable signal medium may be any computer-readable medium other than the computer-readable storage medium. The computer-readable signal medium may send, propagate, or transmit the computer program used by or together with an instruction execution system, apparatus, or device. The computer program codes contained in the computer-readable medium may be transmitted by any suitable medium, including but not limited to wired, optical cable, RF, etc., or any suitable combination thereof.

The application of the embodiments of the present disclosure at least has the following beneficial effects.

(1) In the display control method in the embodiment of the present application, an input display signal is frequency multiplied or divided to generate an output display signal, and a backlight module is controlled to be turned on based on the field frequency of the output display signal so that the liquid crystal stabilization time is increased, that is, the liquid crystal stabilization time is increased by frequency multiplying or dividing, so that there is more time to wait for the liquid crystals to flip and stabilize. That is, the time left for liquid crystal flipping is increased. Thus, the motion blur reduction effect can be improved, the blurred moving pictures can be reduced, and the smearing can be reduced.

(2) In the display control method in the embodiment of the present application, an input display signal is frequency multiplied, and a backlight module is controlled to be turned on in any period from the second to the Nth period among periods, in which N consecutive frames display same data, of the first output display signal, so that the liquid crystal stabilization time is increased. One piece of frame display data may display one picture. In the embodiment of the present application, the liquid crystals are flipped as soon as possible by means of frequency multiplying, and meanwhile, and the backlight is turned on after the liquid crystals are flipped and stabilized within the time for the repeated pictures, that is, the time left for the liquid crystal flipping is increased. Thus, the motion blur reduction effect can be improved, the blurred moving pictures can be reduced, and the smearing can be reduced.

(3) In the display control method in the embodiment of the present application, an input display signal is frequency divided, and the vertical front porch time of the second output display signal is increased so that the liquid crystal stabilization time is increased, that is, there is enough time to wait for the liquid crystals to flip and stabilize and then turn on the backlight. That is, the time left for liquid crystal flipping is increased. Thus, the motion blur reduction effect can be improved, the blurred moving pictures can be reduced, and the smearing can be reduced.

It may be understood by a person of ordinary skill in the art that the operations, methods, steps in the flows, measures and solutions already discussed in the present application may be alternated, changed, combined or deleted. Further, the operations, methods, other steps in the flows, measures and solutions already discussed in the present application may also be alternated, changed, rearranged, decomposed, combined or deleted. Further, prior arts having the operations, methods, the steps in the flows, measures and solutions already discussed in the present disclosure may also be alternated, changed, rearranged, decomposed, combined or deleted.

The terms "first" and "second" are simply used for the purpose of description, and should not be regarded as indicating or implying relative importance or implicitly indicating the number of indicated technical features. Therefore, the features defined as "first" and "second" may explicitly or implicitly include one or more of the features. In the description of the present disclosure, unless specifically stated otherwise, "a plurality of" means "two" or "more than two".

It should be understood that although the steps in the flowchart shown in the drawings are sequentially displayed by following the arrows, these steps are not necessarily performed in the order indicated by the arrows. Unless explicitly stated herein, the execution order of these steps is not strictly limited, and they can be performed in other orders. Moreover, at least some of the steps in the flowcharts shown in the drawings may include multiple sub-steps or multiple stages. These sub-steps or stages are not necessarily performed at the same moment of time, and instead, may be performed at different moments of time. The sub-steps or stages are not necessarily performed sequentially, and instead, may be performed in turn or alternately with other steps or at least some of the sub-steps or stages of other steps.

The foregoing descriptions are merely some implementations of the present application. It should be noted that, to a person of ordinary skill in the art, various improvements and modifications may be made without departing from the principle of the present application, and these improvements and modifications shall be deemed as falling into the protection scope of the present application.

What is claimed is:

1. A display control method, comprising:

frequency multiplying or dividing an input display signal to generate an output display signal based on the relationship between the field frequency of the input display signal and the maximum field frequency supported by a display apparatus, the field frequency of the output display signal being not less than the minimum field frequency supported by the display apparatus and not greater than the maximum field frequency supported by the display apparatus; and controlling a backlight module to be turned on based on the field frequency of the output display signal, so that the liquid crystal stabilization time is increased, wherein the frequency multiplying or dividing an input display signal to generate an output display signal based on the relationship between the field frequency of the input display signal and the maximum field frequency supported by a display apparatus, the field frequency of the output display signal being not less than the minimum field frequency supported by the display apparatus and not greater than the maximum field frequency supported by the display apparatus comprises:

frequency dividing an input display signal to generate a second output display signal when the field frequency of the input display signal is greater than or equal to twice the maximum field frequency supported by the display apparatus, so that the field frequency of the second output display signal is 1/M of the field frequency of the input display signal, where M is an integer not less than 2, the output display signal comprising the second output display signal, and the field frequency of the second output display signal being not less than the minimum field frequency supported by the display apparatus and not greater than the maximum field frequency supported by the display apparatus.

2. The display control method according to claim 1, wherein the frequency multiplying or dividing an input display signal to generate an output display signal based on the relationship between the field frequency of the input display signal and the maximum field frequency supported by a display apparatus, the field frequency of the output display signal being not less than the minimum field frequency supported by the display apparatus and not greater than the maximum field frequency supported by the display apparatus, comprises:

frequency multiplying an input display signal to generate a first output display signal when the field frequency of the input display signal is less than or equal to ½ of the maximum field frequency supported by the display apparatus, so that the field frequency of the first output display signal is N times the field frequency of the input display signal, where N is an integer not less than 2, the output display signal comprising the first output display signal, and the field frequency of the first output display signal being not less than the minimum field frequency supported by the display apparatus and not greater than the maximum field frequency supported by the display apparatus.

3. The display control method according to claim 2, wherein the controlling a backlight module to be turned on based on the field frequency of the output display signal, so that the liquid crystal stabilization time is increased, comprises:

controlling a backlight module to be turned on in any period from the second to the Nth period among periods, in which N consecutive frames display same data, of the first output display signal, so that the liquid crystal stabilization time is increased, the liquid crystal stabilization time being the interval time from the starting time of the vertical front porch time of the first period among periods, in which N consecutive frames display same data, of the first output display signal to the starting time when the backlight module is turned on.

4. The display control method according to claim 3, wherein one period of the input display signal corresponds to N consecutive periods of the first output display signal, and the frame display data of one period of the input display signal is the same as the frame display data of N consecutive periods of the first output display signal.

5. The display control method according to claim 3, wherein the controlling a backlight module to be turned on in any period from the second to the Nth period among periods, in which N consecutive frames display same data, of the first output display signal comprises:
- controlling a backlight module to be turned on in the Nth period among periods, in which N consecutive frames display same data, of the first output display signal.

6. The display control method according to claim 3, after controlling a backlight module to be turned on in any period from the second to the Nth period among periods, in which N consecutive frames display same data, of the first output display signal, comprising:
- controlling a backlight module to be turned off before the starting time of a period, in which next N consecutive frames display same data, of the first output display signal.

7. The display control method according to claim 1, wherein the controlling a backlight module to be turned on based on the field frequency of the output display signal, so that the liquid crystal stabilization time is increased, comprises:
- controlling a backlight module to be turned on at the vertical front porch time of each period of the second output display signal, so that the liquid crystal stabilization time is greater than the vertical front porch time of the input display signal, the liquid crystal stabilization time being the interval time from the starting time of the vertical front porch time of one period of the second output display signal to the starting time when the backlight module is turned on.

8. The display control method according to claim 7, wherein M consecutive periods of the input display signal correspond to one period of the second output display signal, and the frame display data of the first period among the M consecutive periods of the input display signal is the same as the frame display data of one period of the second output display signal.

9. The display control method according to claim 7, wherein the controlling a backlight module to be turned on at the vertical front porch time of each period of the second output display signal, so that the liquid crystal stabilization time is greater than the vertical front porch time of the input display signal, comprises:
- controlling a backlight module to be turned on at the vertical front porch time of each period of the second output display signal, so that the liquid crystal stabilization time is greater than the sum of the vertical front porch time of the input display signal and M-2 periods of the input display signal.

10. The display control method according to claim 7, after controlling a backlight module to be turned on at the vertical front porch time of each period of the second output display signal, comprising:
- controlling the backlight module to be turned off before the starting time of a next period of the second output display signal.

11. A control apparatus, comprising:
- a processor;
- a memory in communication with the processor; and
- at least one computer program stored in the memory and configured to be executed by the processor, the at least one computer program being configured to implement the display control method comprising:
- frequency multiplying or dividing an input display signal to generate an output display signal based on the relationship between the field frequency of the input display signal and the maximum field frequency supported by a display apparatus, the field frequency of the output display signal being not less than the minimum field frequency supported by the display apparatus and not greater than the maximum field frequency supported by the display apparatus; and
- controlling a backlight module to be turned on based on the field frequency of the output display signal, so that the liquid crystal stabilization time is increased,
- wherein the frequency multiplying or dividing an input display signal to generate an output display signal based on the relationship between the field frequency of the input display signal and the maximum field frequency supported by a display apparatus, the field frequency of the output display signal being not less than the minimum field frequency supported by the display apparatus and not greater than the maximum field frequency supported by the display apparatus comprises:
- frequency dividing an input display signal to generate a second output display signal when the field frequency of the input display signal is greater than or equal to twice the maximum field frequency supported by the display apparatus, so that the field frequency of the second output display signal is 1/M of the field frequency of the input display signal, where M is an integer not less than 2, the output display signal comprising the second output display signal, and the field frequency of the second output display signal being not less than the minimum field frequency supported by the display apparatus and not greater than the maximum field frequency supported by the display apparatus.

12. The control apparatus according to claim 11, wherein the frequency multiplying or dividing an input display signal to generate an output display signal based on the relationship between the field frequency of the input display signal and the maximum field frequency supported by a display apparatus, the field frequency of the output display signal being not less than the minimum field frequency supported by the display apparatus and not greater than the maximum field frequency supported by the display apparatus, comprises:
- frequency multiplying an input display signal to generate a first output display signal when the field frequency of the input display signal is less than or equal to ½ of the maximum field frequency supported by the display apparatus, so that the field frequency of the first output display signal is N times the field frequency of the input display signal, where N is an integer not less than 2, the output display signal comprising the first output display signal, and the field frequency of the first output display signal being not less than the minimum field frequency supported by the display apparatus and not greater than the maximum field frequency supported by the display apparatus.

13. A non-transitory computer-readable storage medium, wherein a computer program is stored in the computer-readable storage medium and the computer program is executed by a computer to implement the display control method comprising:

frequency multiplying or dividing an input display signal to generate an output display signal based on the relationship between the field frequency of the input display signal and the maximum field frequency supported by a display apparatus, the field frequency of the output display signal being not less than the minimum field frequency supported by the display apparatus and not greater than the maximum field frequency supported by the display apparatus; and controlling a backlight module to be turned on based on the field frequency of the output display signal, so that the liquid crystal stabilization time is increased, wherein the frequency multiplying or dividing an input display signal to generate an output display signal based on the relationship between the field frequency of the input display signal and the maximum field frequency supported by a display apparatus, the field frequency of the output display signal being not less than the minimum field frequency supported by the display apparatus and not greater than the maximum field frequency supported by the display apparatus comprises:

frequency dividing an input display signal to generate a second output display signal when the field frequency of the input display signal is greater than or equal to twice the maximum field frequency supported by the display apparatus, so that the field frequency of the second output display signal is 1/M of the field frequency of the input display signal, where M is an integer not less than 2, the output display signal comprising the second output display signal, and the field frequency of the second output display signal being not less than the minimum field frequency supported by the display apparatus and not greater than the maximum field frequency supported by the display apparatus.

14. The non-transitory computer-readable storage medium according to claim 13, wherein the frequency multiplying or dividing an input display signal to generate an output display signal based on the relationship between the field frequency of the input display signal and the maximum field frequency supported by a display apparatus, the field frequency of the output display signal being not less than the minimum field frequency supported by the display apparatus and not greater than the maximum field frequency supported by the display apparatus, comprises:

frequency multiplying an input display signal to generate a first output display signal when the field frequency of the input display signal is less than or equal to ½ of the maximum field frequency supported by the display apparatus, so that the field frequency of the first output display signal is N times the field frequency of the input display signal, where N is an integer not less than 2, the output display signal comprising the first output display signal, and the field frequency of the first output display signal being not less than the minimum field frequency supported by the display apparatus and not greater than the maximum field frequency supported by the display apparatus.

15. The non-transitory computer-readable storage medium according to claim 14, wherein the controlling a backlight module to be turned on based on the field frequency of the output display signal, so that the liquid crystal stabilization time is increased, comprises:

controlling a backlight module to be turned on in any period from the second to the Nth period among periods, in which N consecutive frames display same data, of the first output display signal, so that the liquid crystal stabilization time is increased, the liquid crystal stabilization time being the interval time from the starting time of the vertical front porch time of the first period among periods, in which N consecutive frames display same data, of the first output display signal to the starting time when the backlight module is turned on.

16. The non-transitory computer-readable storage medium according to claim 15, wherein one period of the input display signal corresponds to N consecutive periods of the first output display signal, and the frame display data of one period of the input display signal is the same as the frame display data of N consecutive periods of the first output display signal.

17. The non-transitory computer-readable storage medium according to claim 13, wherein the controlling a backlight module to be turned on based on the field frequency of the output display signal, so that the liquid crystal stabilization time is increased, comprises:

controlling a backlight module to be turned on at the vertical front porch time of each period of the second output display signal, so that the liquid crystal stabilization time is greater than the vertical front porch time of the input display signal, the liquid crystal stabilization time being the interval time from the starting time of the vertical front porch time of one period of the second output display signal to the starting time when the backlight module is turned on.

* * * * *